A. TOLKSDORF AND M. C. RUSCH.
TRACTION WHEEL.
APPLICATION FILED NOV. 15, 1920.

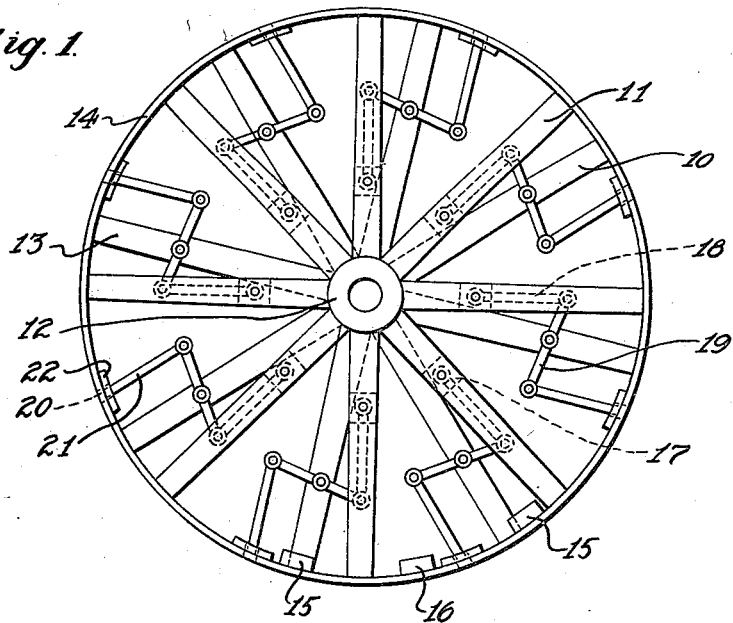
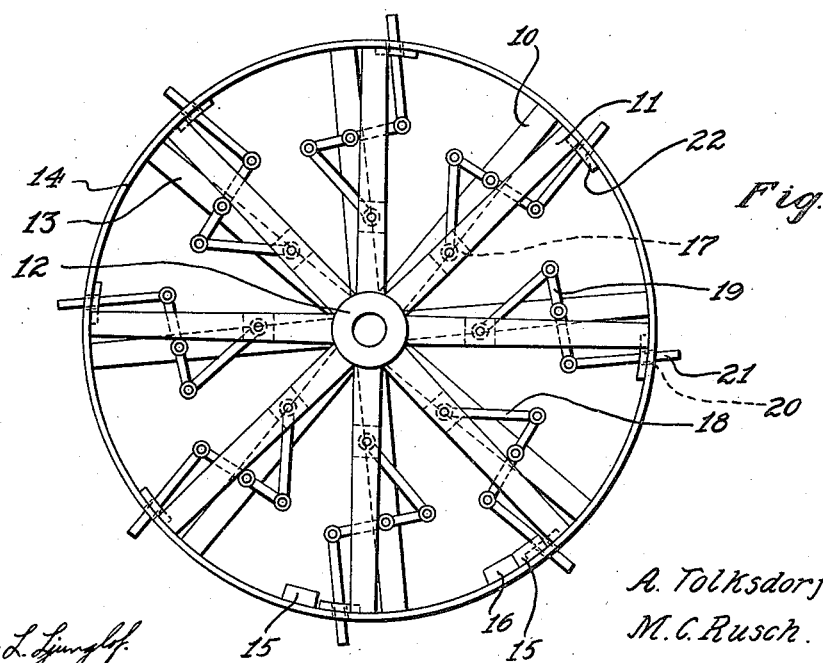

1,431,342.

Patented Oct. 10, 1922.
2 SHEETS—SHEET 2.

A. Tolksdorf and
M. C. Rusch.
INVENTOR

BY Victor J. Evans
ATTORNEY

Patented Oct. 10, 1922.

1,431,342

UNITED STATES PATENT OFFICE.

ADAM TOLKSDORF AND MELVIN C. RUSCH, OF MANITOWOC, WISCONSIN.

TRACTION WHEEL.

Application filed November 15, 1920. Serial No. 424,206.

*To all whom it may concern:*

Be it known that we, ADAM TOLKSDORF and MELVIN C. RUSCH, citizens of United States, residing at Manitowoc, in the county of Manitowoc and State of Wisconsin, have invented new and useful Improvements in Traction Wheels, of which the following is a specification.

This invention relates to wheels for tractors and the like and has for its object the provision of a wheel formed double and having its sections relatively movable within certain limits, this relative movement causing outward movement through one of the sections of lugs which are adapted to engage the ground and to insure traction under any circumstances in which the wheels might ordinarily slip.

An important object is the provision of a wheel of this character which is provided with a novel construction whereby to automatically extend the traction lugs when the wheel has a tendency to slip.

An additional object is the provision of a wheel of this character which will be simple and inexpensive in manufacture, highly efficient in use, durable in service, and a general improvement in the art.

With the above and other objects and advantages in view, the invention consists in the details of construction to be hereinafter more fully described and claimed and illustrated in the accompanying drawings in which—

Figure 1 is a side elevation of our wheel showing it in normal position,

Figure 2 is a similar view showing the sections relatively rotated to cause projection of the traction lugs.

Figure 3:
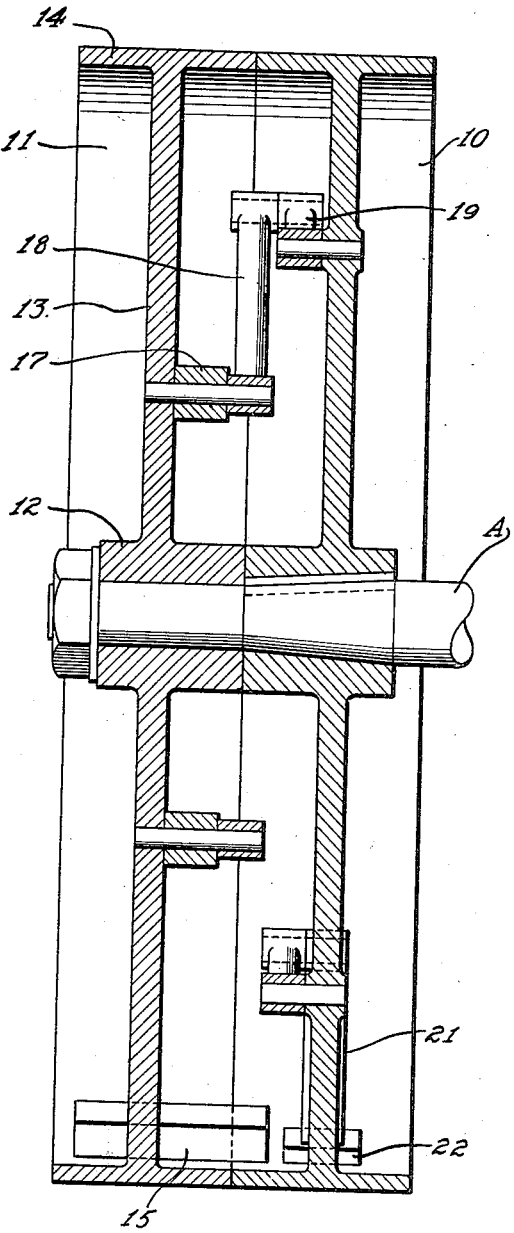
Figure 3 is a cross sectional view.
Figure 4:
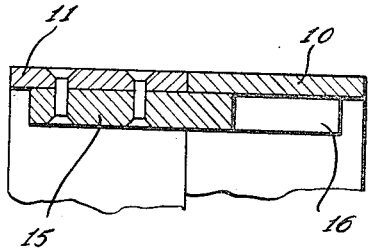
Figure 4 is a cross sectional view showing the interengageable stop cleats carried by the rims.

Referring more particularly to the drawings, the numerals 10 and 11 designate the sections of the wheel and these sections are similar, each including a hub portion 12, spokes 13, and a rim 14. The hubs are of course adapted for engagement upon the vehicle axle indicated at A, and the arrangement is such that these sections are relatively rotatable. Secured upon the rims 14 at spaced intervals are cleats 15 and 16, there being two of the former carried by the section 11 and there being one of the latter carried by the section 10. These cleats are adapted to engage one another for limiting the relative rotation of the sections.

Certain spokes of the section 11 carry blocks 17 upon which are pivoted levers 18 and these levers are pivotally connected with the ends of levers 19 which are pivoted to spokes of the wheel section 10. The wheel section 10 has its rim provided with openings 20 through which are slidable lugs 21 formed as suitable elongated bars and these lugs are pivotally connected with the free ends of the levers 19. It should be stated that it is preferable to reinforce the rim, as shown at 22, around the openings 20.

In the use of the device it will be seen that if the tractor if the like equipped with the wheel strikes a muddy place and the wheel tends to slip there will be relative rotation of the section 10 with respect to the section 11, the section 10 being the only one driven. This relative rotation will cause swinging of the levers 19 and 18 which are pivotally connected with the spokes of the sections and this movement of the levers will result in projecting the lugs 21 through the openings 20 so as to extend considerably beyond the rim and consequently provide means for insuring traction so that the wheels may pull out of a muddy or otherwise slippery place. After the wheel has pulled out of the mud and strikes hard ground the engagement of the lugs with the hard ground will cause the section 11 to slip in a reverse direction with respect to the section 10 so that the parts will be in normal position. The engagement of the cleats 15 and 16 prevents injury to any of the parts and limits the rotary movement of each section with respect to the other.

From the foregoing description and a study of the drawings it will be apparent that we have thus provided a simply constructed and easily applied traction wheel which will insure traction in mud or under other similar adverse conditions, the action of the moving parts being entirely automatic.

While we have shown and described the preferred embodiment of our invention it is of course to be understood that we reserve the right to make such changes in the form, construction, and arrangement of parts as will not depart from the spirit of the invention or the scope of the subjoined claims.

Having thus described our invention, we claim:

1. A wheel of the character described comprising a pair of similar sections each including a rim, spokes, and a hub portion, one section being positively driven and the other being idle whereby the sections will be relatively rotatable, means for limiting relative rotary movement of the sections, and lugs associated with the driven section and adapted to be projected therebeyond when relative movement of the sections occurs.

2. A wheel of the character described comprising a pair of sections of the same diameter and each including a rim, spokes, and a hub portion, one section being positively driven and the other being idle whereby relative rotation of the sections may occur, means for limiting relative rotation of the sections in both directions, levers pivoted upon the spokes of the idle section, levers pivoted upon the spokes of the driven section and pivotally connected with said first named levers, and lugs carried by the free ends of the second named levers and projectable through openings in the rim.

3. A traction wheel comprising a pair of similar sections mounted for relative rotary movement, lugs carried by one of the sections, and means carried by the other section whereby to project said lugs when relative rotation of the two sections occurs.

4. A traction wheel comprising a pair of similar sections mounted for relative rotary movement, a plurality of lugs carried by one section and adapted to be projected beyond the periphery thereof, and a link and lever connection associated with the other section and connected with said link whereby to project the latter when the sections are relatively rotated.

5. A traction wheel comprising a plurality of relatively rotatable sections arranged side by side and having the same diameter, lugs carried by one section, and means for automatically projecting said lugs when relative rotation of the sections occurs.

6. In a traction wheel, a pair of relatively rotatable sections arranged side by side and having the same diameter, and lugs carried by one section and engaged by the other section whereby to be projected when relative rotation of the sections occurs.

7. In a traction wheel, a pair of relatively rotatable sections arranged side by side and having the same diameter, lugs carried by one section and means on the other section for projecting said lugs when relative rotation of the sections occurs.

In testimony whereof we affix our signatures.

ADAM TOLKSDORF.
MELVIN C. RUSCH.